United States Patent [19]
Morlion et al.

[11] Patent Number: 5,921,796
[45] Date of Patent: Jul. 13, 1999

[54] BACKPANEL CONNECTOR SYSTEM

[75] Inventors: Danny Morlion, St. Amandsberg; Jan Peter Karel van Koetsem, Zwijndrecht; Luc van den Torren, Bonheiden, all of Belgium

[73] Assignee: Framatome Connectors International, Courbevoie, France

[21] Appl. No.: 08/854,155

[22] Filed: May 9, 1997

[30] Foreign Application Priority Data

May 17, 1996 [NL] Netherlands ............................ 1003147

[51] Int. Cl.⁶ .................................................. H01R 13/64
[52] U.S. Cl. .......................................................... 439/247
[58] Field of Search .................................... 439/247, 248, 439/252, 246, 378, 379, 374, 350–358; 385/58, 59, 134, 135

[56] References Cited

U.S. PATENT DOCUMENTS

| | | | |
|---|---|---|---|
| 5,259,779 | 11/1993 | Ooya et al. | 439/247 |
| 5,306,168 | 4/1994 | Kunishi et al. | 439/248 |
| 5,326,279 | 7/1994 | Sumida | 439/540.1 |
| 5,328,381 | 7/1994 | Seymour et al. | 439/247 |
| 5,584,721 | 12/1996 | Taniuchi et al. | 439/374 |

FOREIGN PATENT DOCUMENTS

| | | |
|---|---|---|
| 0571037 A1 | 11/1993 | European Pat. Off. . |
| 0602726 A1 | 6/1994 | European Pat. Off. . |

*Primary Examiner*—Steven L. Stephan
*Assistant Examiner*—Javaid Nasri
*Attorney, Agent, or Firm*—Perman & Green, LLP

[57] ABSTRACT

A backpanel connector system comprises a backpanel connector, a board connector and a plurality of connector plugs for optical fibers. The backpanel connector comprises a first and a second housing, said first housing having a bottom with an opening. The second housing is slidably mounted in said first housing in a z-direction extending perpendicular to the bottom of the first housing. The second housing has a receiving space for a connector plug. The second housing is also movable in x- and y-directions with respect to the first housing. The second housing and the board connector are provided with co-operating positioning means for positioning the second housing in x- and y-directions with respect to the board connector during insertion of the board connector into the first housing.

15 Claims, 7 Drawing Sheets

BACKPANEL CONNECTOR SYSTEM

BACKGROUND OF THE INVENTION

The invention relates to a backpanel connector system comprising a backpanel connector, a board connector and a plurality of connector plugs for optical fibers, wherein said backpanel connector comprises a first and a second housing, said first housing having a bottom with an opening, wherein said second housing is slidably mounted in said first housing in a z-direction extending perpendicular to the bottom of the first housing, said second housing having a receiving space for a connector plug.

In a known connector system of this type the second housing is movable with respect to the first housing in the z-direction only. This means that when using the known connector system very high requirements must be met regarding the accuracy for mounting the backpanel connector on the backpanel and the board connector on the printed circuit board, respectively, and regarding the accuracy for alignment of the printed circuit board with respect to the backpanel connector. In the known connector system this accuracy determines the accuracy of the mutual alignment of the connector plugs inserted into the backpanel connector and the board connector, respectively. In practical circumstances it is very difficult to meet these accuracy requirements.

SUMMARY OF THE INVENTION

The invention aims to provide an improved connector system of this type.

To this end the invention provides a connector system of the above-mentioned type wherein the second housing is also movable in x- and y-directions with respect to the first housing and wherein the second housing and the board connector are provided with co-operating positioning means for positioning the second housing in x- and y-directions with respect to the board connector during insertion of the board connector into the first housing.

In this manner a connector system is obtained wherein due to the freedom of movement of the second housing in x- and y-directions with respect to the first housing, the cooperating positioning means of the board connector and the second housing provide for a positioning of this second housing with respect to the board connector with such an accuracy that the corresponding connector plugs will be mutually aligned with sufficient accuracy to insert the usual guiding pins of one of the connector plugs into the usual guiding holes of the other connector plug.

BRIEF DESCRIPTION OF THE DRAWINGS

The invention will be further explained by reference to the drawings, in which two embodiments of the backpanel connector system according to the invention are schematically shown.

DETAILED DESCRIPTION OF THE PREFERRED EMBODIMENTS

Figure 1:
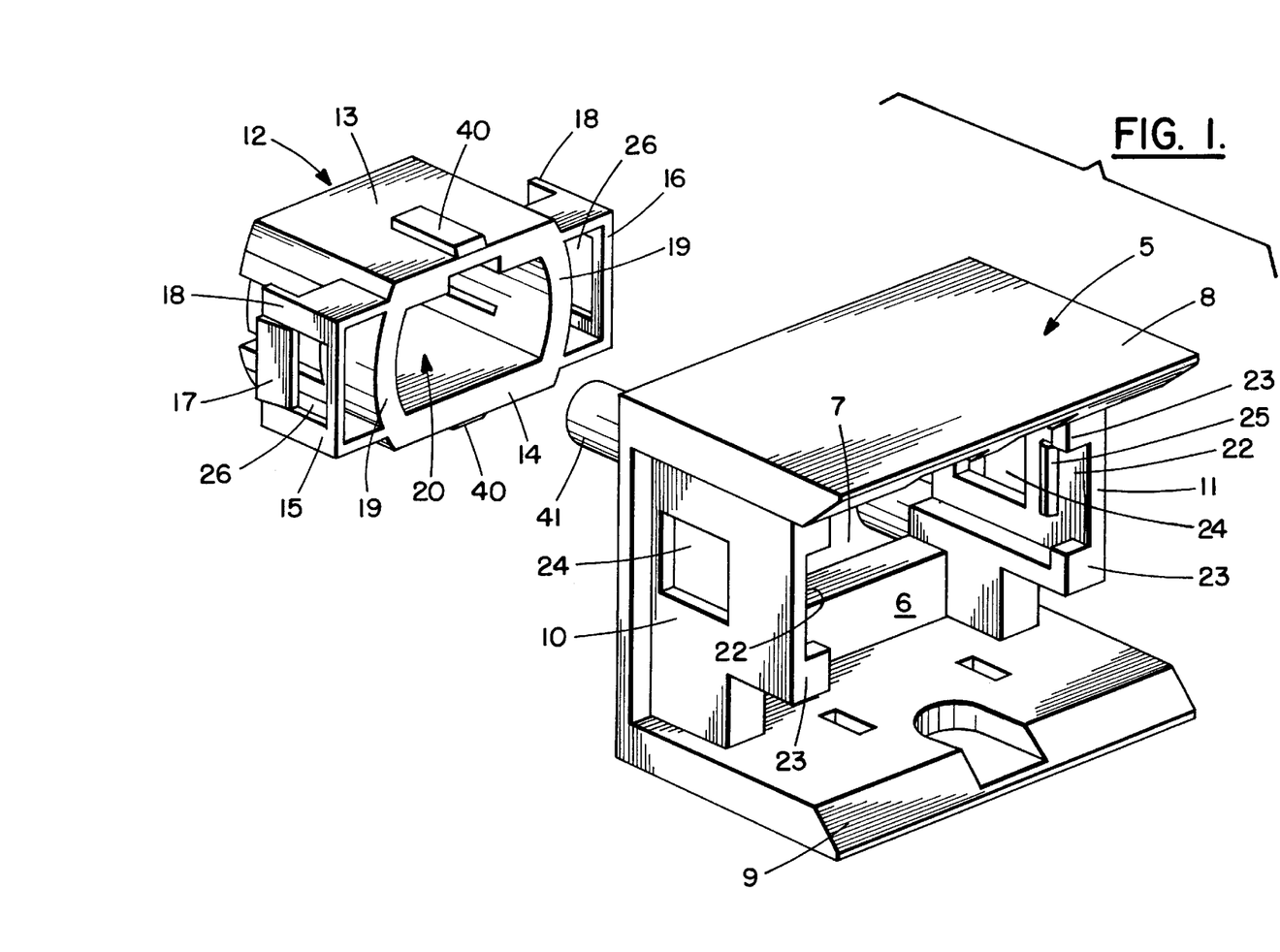
FIG. 1 shows an exploded view of a backpanel connector according to a first embodiment of the connector system of the invention.
Figure 3:
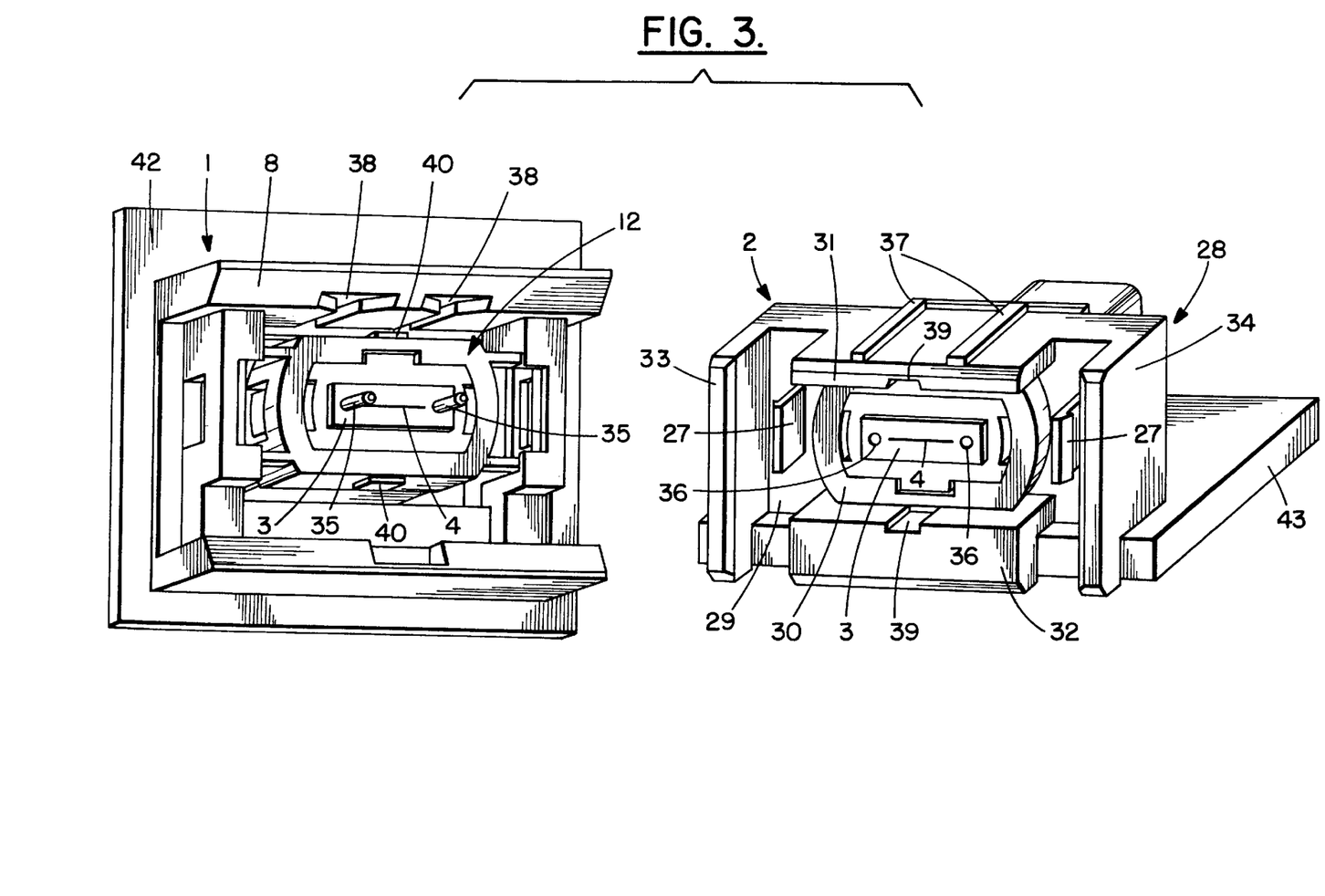
FIG. 3 shows a perspective view of the backpanel connector of FIG. 1 as assembled, wherein a connector plug has been inserted into the second housing and wherein a corresponding board connector of the connector system is shown, into which a connector plug is also inserted.

FIG. 1 shows an exploded view of a backpanel connector 1 of a backpanel connector system, further comprising a board connector 2 shown in FIG. 3 and a plurality of connector plugs 3 for optical fibers 4. The connector plugs 3 are further described in earlier patent applications of the same applicant deemed to be incorporated by reference. Only the ends of the optical fibers 4 are shown in FIG. 3, said ends being located in the contact face of the connector plug 3.

The backpanel connector 1 comprises a first housing 5 having a bottom 6 with an opening 7 and four side walls 8-11 extending upwardly from the bottom 6, wherein the side walls 8 and 9, and 10 and 11, respectively are lying opposite each other. Further the backpanel connector 1 comprises a second housing 12 with two opposite side walls 13 and 14 and two opposite side walls 15 and 16. The side walls 15 and 16 each carry a projection 17 carried by a springy extension 18 of the corresponding side wall 15, 16. Walls 19 are provided between the side walls 13, 14, said walls 19 together with the side walls 13, 14 determine a somewhat elongated receiving space 20 for a connector plug 3. These walls 19 are further provided with locking fingers 21 for retaining an inserted connector plug as further described in the above-mentioned patent applications of the applicant.

Figure 2:
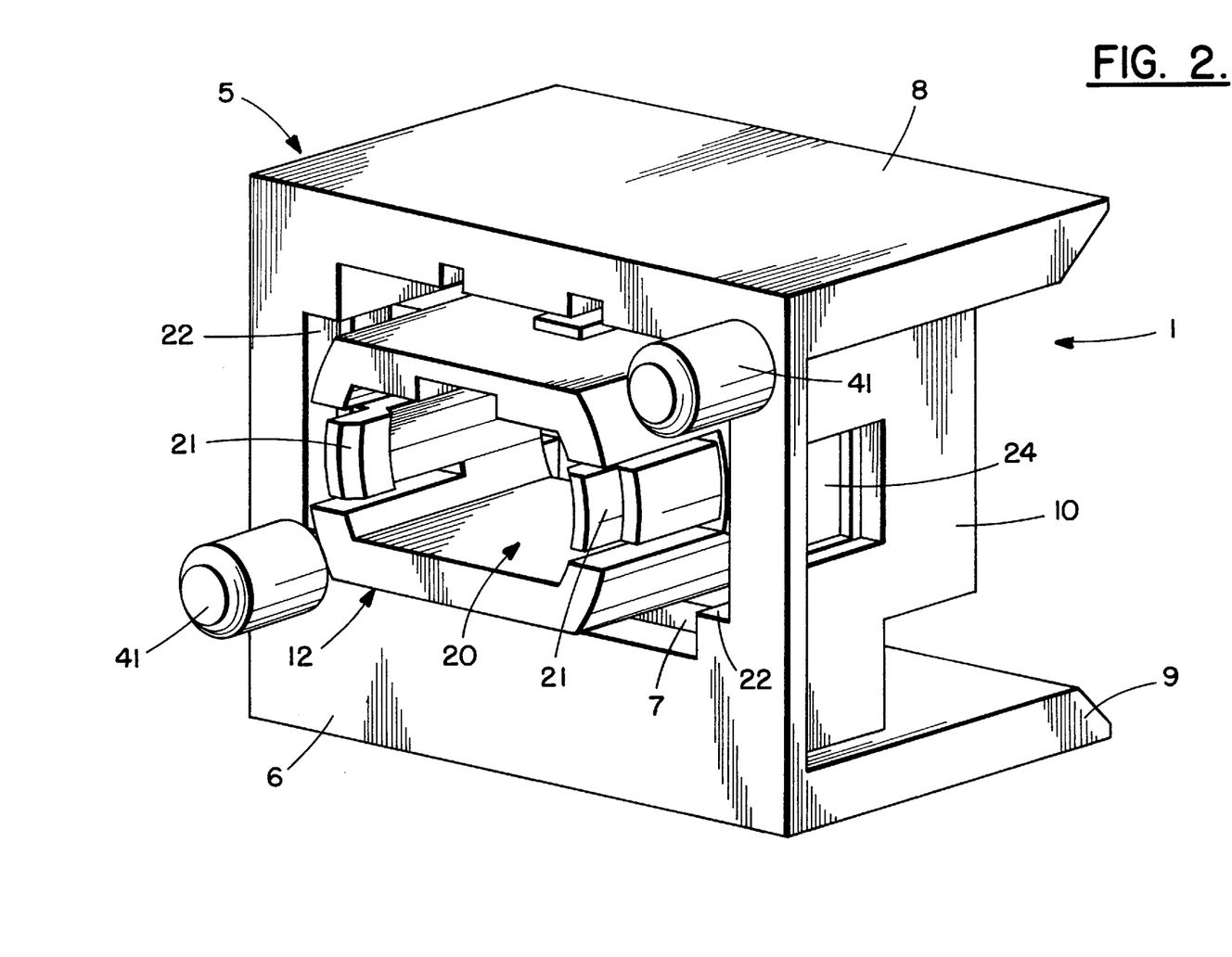
FIG. 2 shows a perspective view of the backpanel connector of FIG. 1 as seen from the bottom side.

The housing 12 can be mounted easily in the housing 5 by pushing the housing 12 through the opening 7 in the bottom 6 into the housing 5. The side walls 15, 16 are received in slots 22 provided in the side walls 10, 11 of the housing 5. As can be seen in FIG. 2, the slots 22 debouch in the bottom 6 and join the opening 7 in this bottom. At the side opposite the bottom 6 the slots 22 are closed by a stop edge 23. These stop edges 23 determine the end position of the second housing 12 within the first housing 5 opposite of the bottom 6. It is noted that by a suitable design of the projections 17 it is also possible to push the second housing 12 from the other side into the first housing 5 and to provide the stop edges 23 at the bottom side of the slots 22.

When the second housing 12 is pushed into the first housing 5, the projections 17 are pushed inwardly and by pushing further the projections 17 are received in slot openings 24 provided at the location of the slots 22 in the side walls 10, 11. As the projections 17 have end edges at the side directed towards the bottom 6 which extend substantially perpendicularly to the side walls 10, 11, the second housing 12 cannot be pushed out of the first housing 5 in an easy manner.

Therefore, mounting the second housing 12 within the first housing 5 is very simple. Further, the backpanel connector 1 can be mounted on a backpanel as a unit.

The second housing 12 is slidable within the first housing 5 in a z-direction extending substantially perpendicularly to the bottom 6, wherein the projections 17 guide the housing 12 in the slot openings 24. Further, the housing 12 has some freedom of movement in x- and y-directions within the housing 5 because the slots 22 have larger dimensions than the corresponding dimensions of the side walls 15, 16 of the housing 12. This freedom of movement of the housing 12 within the housing 5 is very important to be able to couple two connector plugs 3 with each other in a correct manner, which connector plugs 3 are inserted into the backpanel connector 1 and the board connector 2, respectively.

It is noted that the second housing 12 is also indicated as being a floating insert. The freedom of movement of the housing 12 is restricted in z-direction by the stop edges 23 and abutting of the end edges of the projections 17 against the end edges of the slot opening 24, respectively. In the end position of the housing 12 determined by the stop edges 23, the housing 12 is detachably retained because projections 25 are provided in the slots 22 engaging into lock openings 26 provided in the side walls 15, 16 of the housing 12. These lock openings 26 are further adapted to cooperate with lock fingers 27 of the board connector 2, as will be explained hereinafter.

As shown in FIG. 3 this board connector 2 comprises a third housing 28 adapted to be inserted into the first housing 5 of the backpanel connector 1. The locking fingers 27 are carried by a bottom 29 further having a receiving space 30 for a connector plug 3. In the same manner as at the receiving space 20 of the second housing 12, locking fingers not shown in the drawings are provided at the receiving space 30 for retaining an inserted connector plug 3. Further the third housing 28 comprises two opposite side walls 31 and 32 and two opposite side walls 33 and 34 extending outside of the locking fingers 27 substantially parallel to said locking fingers. The side walls 31-34 extend from the bottom 29 along a greater length than the locking fingers 27 so that these fingers 27 are lying protected within the housing 28.

When the housing 28 is inserted into the housing 5, the locking fingers 27 engage into the locking openings 26 of the second housing 12 and an edge 45 surrounding the receiving space 30 or the inserted connector plugs 3 release the second housing 12 from the projections 25. When the board connector 2 is disconnected from the backpanel connector 1 these locking fingers 27 retract the second housing 12 into the end position in which the second housing is retained by the projections 25 of the first housing 5. The freedom of movement of the housing 12 in the z-direction facilitates for a variation of the location of the interface of the connector plugs 3. Thereby a so-called contact range is obtained in which independent of tolerances in the distance between the backpanel and an inserted printed circuit board a good contact between the contact faces of the connector plugs 3 is guaranteed.

As further described in the above-mentioned patent applications of the applicant, the connector plugs 3 are provided with guiding pins 35 or guiding holes 36 for receiving these guiding pins 35. The guiding pins 35 and the guiding holes 36, respectively, provide for an alignment of the optical fibers 4 with a microprecision accuracy. In order to insert the guiding pins 35 into the guiding holes 36 the connector plugs 3 and the receiving spaces 20 and 30, respectively, should be aligned with sufficient accuracy. In this respect it is important to note that the accuracy of the guidance of a printed circuit board in the rails of a system housing with respect to a backpanel lies in the order of 2 mm, whereas the accuracy for alignment of the guiding pins and the guiding holes should be in the order of only 0.02 mm.

To obtain the required accuracy of alignment in the connector system described, the second housing 12 is received in the slots 22 with a freedom of movement in x- and y-directions. Thereby the second housing 12 of the backpanel connector 1 can be moved into the correct position with respect to the receiving space 30 of the board connector 2. For this purpose the following provisions are provided in the connector system described. First, the side wall 31 of the third housing 28 is provided with two guiding lugs 37 at the outer side and the side wall 8 of the first housing 5 is provided with two guiding slots 38 with widened entrance. These guiding lugs 37 and guiding slots 38 provide a polarisation of the board connector 2 with respect to the backpanel connector 1 on the one side, i.e. the board connector can be inserted into the backpanel connector in one position only, and on the other side provide for a prealignment of the housing 28 with respect to the housing 5.

Further the walls 31, 32 each are provided with a guiding slot 39 made accurately and the side walls 13, 14 of the second housing 12 are provided with guiding lugs 40 made accurately and adapted to cooperate with the slots 39. As the housing is able to move in x- and y-directions, these slots 39 and guiding lugs 40 provide for an accurate positioning of the second housing 12 with respect to the receiving space 30 and thereby with respect to the connector plug 3 inserted into the same.

From the above it will be clear that in the connector system according to the invention a triple alignment of the optical fibers is realized, wherein the guiding lugs 37 and guiding slots 38 provide for the first phase, the guiding slots 39 and guiding lugs 40 provide for the second phase and the guiding pins 35 and guiding holes 36 provide for the third phase.

It is noted that the bottom 6 of the housing 5 comprises two mounting pins 41 for attaching the housing 5 on a backpanel 42 partially shown in FIG. 3. The housing 28 can be equipped with one or more corresponding mounting pins for attachment to a printed circuit board 43 also only partially shown in FIG. 3.

FIGS. 4–7 show a second embodiment of the backpanel connector system according to the invention, which is mainly made in the same manner as the connector system of FIGS. 1–3, so that this second embodiment will not be again described in detail hereinafter. Corresponding parts are indicated by the same reference numerals.

Figure 4:
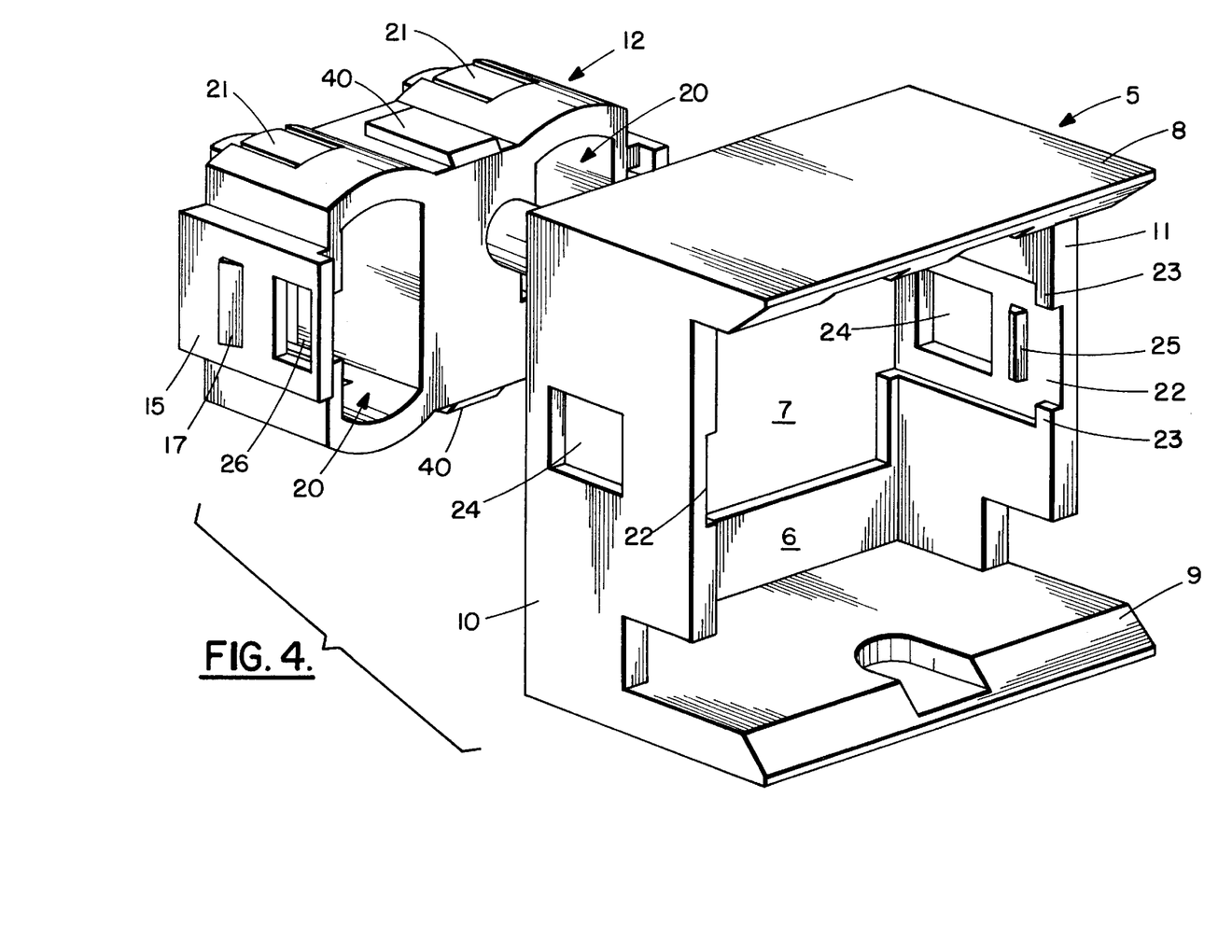
FIG. 4 shows an exploded view corresponding with FIG. 1 of a backpanel connector according to a second embodiment of the connector system according to the invention.
Figure 5:
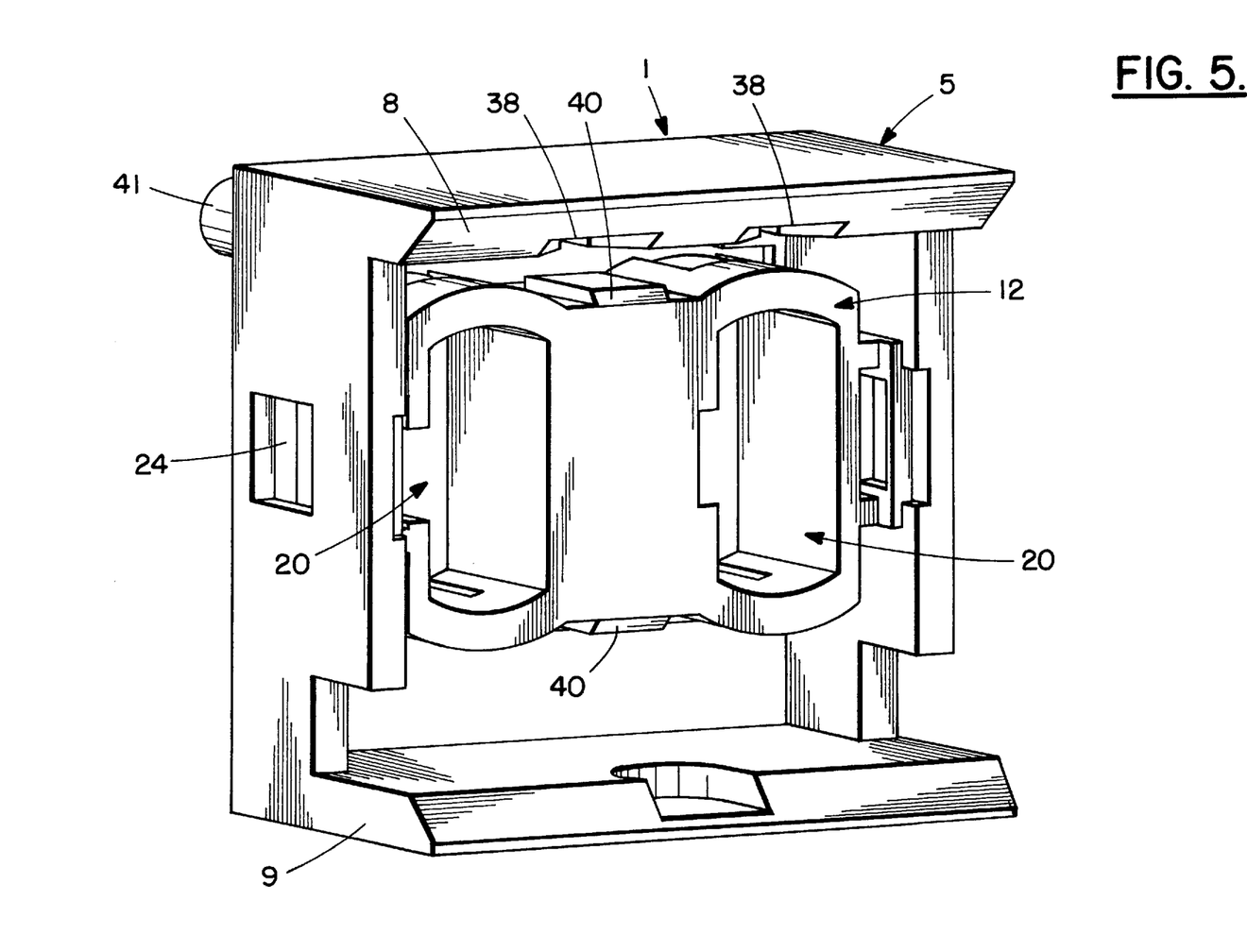
FIG. 5 shows a perspective view of the backpanel connector of FIG. 4 as assembled.

As shown in FIGS. 4 and 5, in this case the second housing 12 is provided with two receiving spaces 20 for connector plugs 3, wherein in this case the longitudinal axis of the receiving spaces 20 extends parallel to the side walls 15, 16 instead of parallel to the side walls 13, 14 as in the embodiment of FIGS. 1–3. For the remaining part the housing 5 and the housing 12 are mainly made in the same manner as in the above described embodiment.

Figure 6:
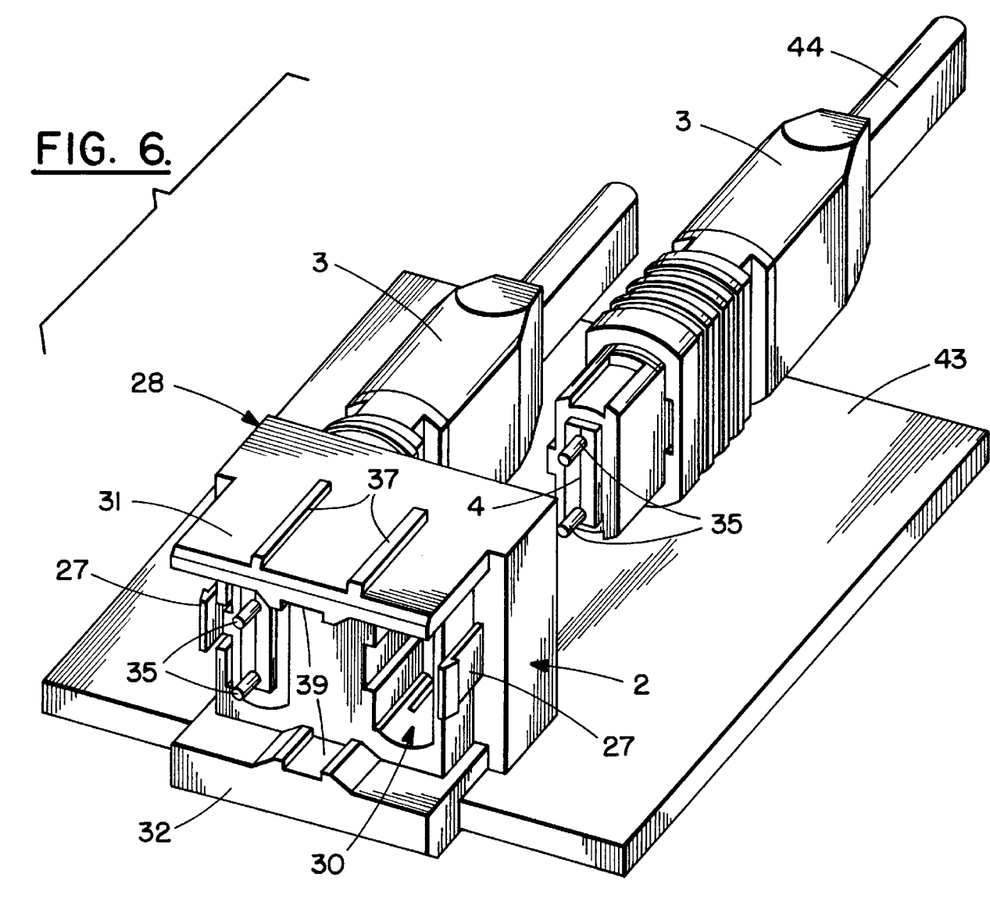
FIG. 6 shows a perspective view of a board connector adapted to be inserted into the backpanel connector of FIG. 5, wherein two corresponding connector plugs are shown.

FIG. 6 shows the board connector 2 of the backpanel connector 1 of FIGS. 4, 5, wherein one connector plug 3 is inserted into a receiving space 30 and a second connector plug 3 is shown in a disconnected position. FIG. 6 shows that the optical fibers 4 are part of an optical fiber cable 44. In this case the third housing 28 only has side walls 31, 32. The side wall 31 carries guiding lugs 37, whereas the side walls 31 and 32 at their inner side each have a guiding slot 39. As an alternative it is possible to provide the housing 28 with the side walls 33, 34 in the same manner as in the embodiment of FIGS. 1–3.

Figure 7:
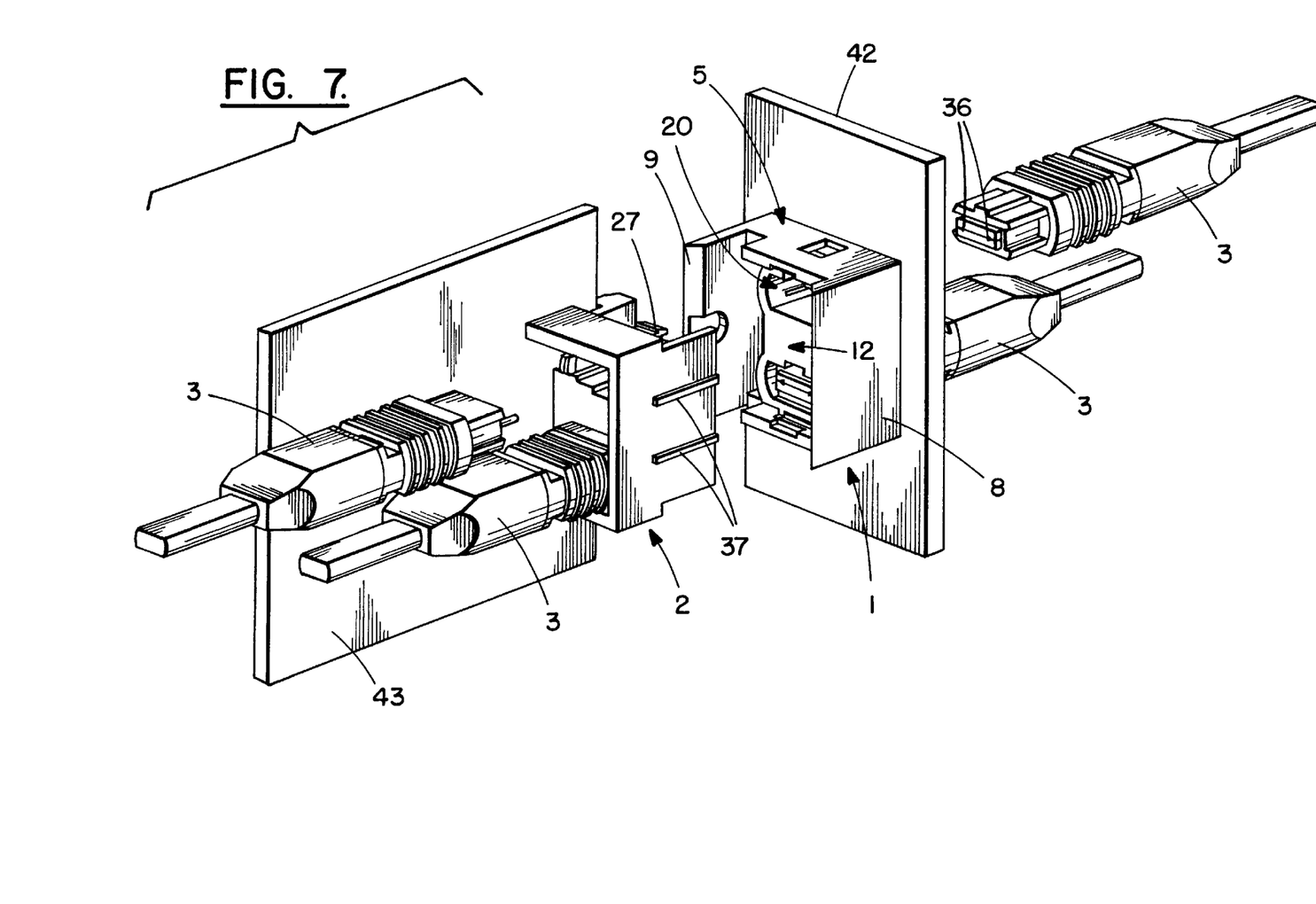
FIG. 7 shows a perspective view of the backpanel connector of FIG. 5 and the board connector of FIG. 6 with corresponding connector plugs partially disconnected.

FIG. 7 shows the complete connector system in a partially disconnected position. The board connector 2 can be inserted with the printed circuit board 43 into the backpanel connector 1, whereas the connector plugs 3 can be inserted into the receiving spaces 20 and the receiving spaces 30, respectively, and can be retained by these receiving spaces independent of the fact whether the backpanel connector 1 and the board connector 2 are coupled or not.

Also in this second embodiment the described system of triple alignment of the optical fibers is used, wherein due to a freedom of movement of the housing 12 in x- and y-directions the housing 12 can be positioned with sufficient accuracy with respect to the receiving spaces 30 or the connector plugs 3 inserted into the same, by the cooperating slots 39 and lugs 40.

The embodiment of FIGS. 4–7 shows the advantage that at equal dimensions in the direction of the side walls 8, 9 and 13, 14 and 31, 32, respectively, two connector plugs 3 can be provided, i.e. twice the number of optical fibers at equal height.

Preferably the connector system described also comprises backpanel connectors and board connectors for electrical contacts, wherein the dimensions of the connectors in the direction of the walls 8, 9 and 13, 14 and 31, 32, respectively, remain the same.

It is noted that in the specification and claims the x-, y- and z-directions refer to an orthogonal coordinate system.

The invention is not restricted to the above described embodiments which can be varied in a number of ways within the scope of the claims.

What is claimed is:

1. Backpanel connector system comprising a backpanel connector, a board connector and at least first and second connector plugs for optical fibers, said backpanel connector having a first receiving space for a first connector plug, said board connector having a second receiving space for a second connector plug, wherein said backpanel connector comprises a first and a second housing, said first housing having a bottom with an opening, said second housing being slidably mounted in said first housing in a z-direction extending perpendicular to the bottom of the first housing and further being movable in x- and y-directions with respect to the first housing, wherein said second housing is provided with said first receiving space for receiving said first connector plug inserted through the opening in the bottom of the first housing and wherein the board connector is adapted to be inserted into the first housing to interconnect the first and second connector plugs received in the corresponding receiving spaces, the second housing and the board connector being provided with cooperating positioning means for positioning the second housing in x- and y-directions with respect to the board connector during insertion of the board connector into the first housing to thereby align the first connector plug receiving in said first receiving space and the second connector plug received in said second receiving space.

2. Connector system according to claim 1, wherein the board connector comprises a third housing adapted to be inserted into the first housing and having a bottom with said second receiving space for said second connector plug, said third housing having two opposite side walls, wherein at least one of the side walls of the third housing has a first guiding slot at its inner side, said second housing having corresponding opposite side walls, wherein at least one of the side walls of the second housing has a first guiding lug at its outer side, said first guiding slot and first guiding lug being part of said co-operating positioning means.

3. Connector system according to claim 1, wherein said first housing is provided with two further opposite side walls, a slot being provided in each of said two further opposite side walls, wherein said second housing is provided with two further opposite side walls which are received in said slots of the further opposite side walls of the first housing with freedom of movement in x- and y- directions.

4. Connector system according to claim 1, wherein the second and third housing each have at least two receiving spaces for a connector plug.

5. Connector system according to claim 2, wherein at least one of said side walls of the third housing has at least one second guiding lug at its outer side, and wherein the first housing is provided with opposite side walls, one of said side walls of the first housing having at least one second guiding slot adapted to cooperate with said at least one second guiding lug during insertion of the third housing into the first housing.

6. Backpanel connector system comprising a backpanel connector, a board connector and at least first and second connector plugs for optical fibers, said backpanel connector having a first receiving space for a first connector plug, said board connector having a second receiving space for a second connector plug, wherein said backpanel connector comprises a first and a second housing, said first housing having a bottom with an opening, said second housing being slidably mounted in said first housing in a z-direction extending perpendicular to the bottom of the first housing and further being movable in x- and y- directions with respect to the first housing, wherein said second housing is provided with said first receiving space for receiving said first connector plug inserted through the opening in the bottom of the first housing and wherein the board connector is adapted to be inserted into the first housing to interconnector the first and second connector plugs received in the corresponding receiving spaces, the second housing and the board connector being provided with cooperating positioning means for positioning the second housing in x- and y-directions with respect to the board connector during insertion of the board connector into the first housing to thereby align the first connector plug received in said first receiving space and the second connector plug received in said second receiving space, wherein said first housing is provided with two opposite side walls, a slot being provided in each of said two opposite side walls, wherein said second housing is provided with two corresponding opposite side walls which are received in said slots of the opposite side walls of the first housing with freedom of movement in x- and y-directions, wherein said slots each are closed at one end by a stop edge and are open at the other end, wherein the second housing can be pushed into the first housing through the open ends of the slots, wherein slot openings are provided in the side walls of the first housing at the location of the slots, said corresponding opposite side walls of the second housing being provided with projections supported in a springy manner and received in said slot openings, wherein cooperating projections and slot openings determine the freedom of movement of the second housing at least in the direction of the open ends of the slots.

7. Connector system according to claim 6, wherein the projections of the second housing are formed on springy extensions of the corresponding side walls of the second housing.

8. Connector system according to claim 6, wherein said side walls of the second housing are provided with a locking opening and wherein said side walls of the first housing carry a positioning projection in each slot, said positioning projection being adapted to engage into the corresponding locking opening for holding the second housing in a predetermined position with respect to the first housing.

9. Connector system according to claim 6, wherein the second and third housings each have at least two receiving spaces for a connector plug.

10. Connector system according to claim 8, wherein a bottom of a third housing carries locking fingers adapted to engage into the locking openings of the second housing.

11. Connector system according to claim 10, wherein the stop edges are provided at the end of the slots opposite of the bottom, wherein a passage for the corresponding locking finger of the third housing is provided in the stop edge of each slot of the first housing.

12. Connector system according to claim 10, wherein the third housing has two opposite side walls extending parallel to the locking fingers at the outer side thereof.

13. Connector system according to claim 10, wherein a side wall with a guiding lug of the third housing extends further from the bottom than the locking fingers.

14. Backpanel connector for use in a backpanel connector system, said backpanel connector comprising a first and a second housing, said first housing having a bottom with an opening, said second housing being slidably mounted in said first housing in a z-direction extending perpendicular to the bottom of the first housing and further being movable in x- and y-directions with respect to the first housing, wherein said second housing is provided with a first receiving space for receiving a connector plug inserted through the opening in the bottom of the first housing, said second housing having opposite side walls, wherein at least one of the side walls of the second housing has a first guiding lug at its outer side, wherein the first housing is provided with opposite side walls, one of said side walls of the first housing having at least one second guiding slot, wherein said first housing is provided with two further opposite side walls, a slot being provided in each of said two further opposite side walls, wherein said second housing is provided with two further opposite side walls which are received in said slots of the further opposite side walls of the first housing with freedom of movement of x- and y-directions.

15. Board connector for use in a backpanel connector system, said board connector comprising a third housing having a bottom with a receiving space for a connector plug, said third housing having two opposite side walls, wherein at least one of the side walls of the third housing has a first guiding slot at its inner side, wherein at least one of said walls of the third housing has at least one second guiding lug at its outer side.

* * * * *